(12) United States Patent
Kim et al.

(10) Patent No.: US 11,606,854 B2
(45) Date of Patent: Mar. 14, 2023

(54) LIGHTING DEVICE AND PERFORMANCE SYSTEM COMPRISING SAME

(71) Applicant: HYBE CO., LTD., Seoul (KR)

(72) Inventors: Dongik Kim, Seoul (KR); Hyuntaek Kwon, Seoul (KR); Changon Lee, Seoul (KR); Sunho Cho, Seoul (KR)

(73) Assignee: HYBE CO., LTD, Seoul (KR)

( * ) Notice: Subject to any disclaimer, the term of this patent is extended or adjusted under 35 U.S.C. 154(b) by 0 days.

(21) Appl. No.: 17/827,978

(22) Filed: May 30, 2022

(65) Prior Publication Data

US 2022/0400545 A1 Dec. 15, 2022

Related U.S. Application Data

(63) Continuation of application No. 16/772,089, filed as application No. PCT/KR2018/001839 on Feb. 12, 2018, now Pat. No. 11,350,509.

(Continued)

(30) Foreign Application Priority Data

Jan. 17, 2018 (KR) ........................ 10-2018-0006309

(51) Int. Cl.
*H05B 47/165* (2020.01)
*H05B 47/19* (2020.01)
(Continued)

(52) U.S. Cl.
CPC ........... *H05B 47/165* (2020.01); *H05B 47/16* (2020.01); *H05B 47/19* (2020.01); *H05B 47/155* (2020.01)

(58) Field of Classification Search
CPC ......... H04L 67/12; H04L 67/10; H04L 67/22; H04L 12/2816; H04L 12/282; H04L 12/2829; H04L 63/08; H04L 67/1097; H04L 67/42; H04L 12/2803; H04L 12/2818; H04L 12/2823; H04L 2012/2841; H04L 2012/285; H04L 29/06047; H04L 67/30; H04L 51/02; H04L 63/102; H04L 67/306; H04L 63/0236; H04L 63/0428; H04L 67/26; H04L 67/34; H04L 63/0861;
(Continued)

(56) References Cited

U.S. PATENT DOCUMENTS

2014/0310788 A1* 10/2014 Ricci ...................... G06F 21/31
726/6
2014/0370892 A1* 12/2014 Gottimukkala ..... H04W 60/005
455/435.1

(Continued)

*Primary Examiner* — Monica C King
(74) *Attorney, Agent, or Firm* — Capitol IP Law Group, PLLC

(57) ABSTRACT

A lighting device according to an embodiment of the present invention comprises: a light source unit; a first communication unit for receiving library data from a mobile terminal; a storage unit for storing the library data; a second communication unit for receiving a control message indicating an execution command of a library corresponding to the library data from a control device; and a processor for controlling the light source unit such that the library is executed according to the control message, wherein the processor can control operation timing of the light source unit by sequentially receiving the control message at least a predetermined number of times at the initiation of the execution of the library.

20 Claims, 16 Drawing Sheets

Related U.S. Application Data

(60) Provisional application No. 62/597,438, filed on Dec. 12, 2017.

(51) Int. Cl.
*H05B 47/16* (2020.01)
*H05B 47/155* (2020.01)

(58) Field of Classification Search
CPC ....... H04L 63/04; H04L 67/125; H04L 67/20; H04L 67/303; H04L 69/24; H04L 51/046; H04L 63/0853; G06F 21/32; G06F 3/017; G06F 21/00; G06F 3/0488; G06F 16/25; G06F 16/583; G06F 16/951; G06F 21/31; G06F 9/54; G06F 9/541; G06F 9/546; G06F 3/013; G06F 3/0481; G06F 3/0482; G06F 3/04842; G06F 16/183; G06F 16/24575; G06F 16/252; G06F 2203/04803; G06F 3/04886; G06F 3/0622; G06F 3/0637; G06F 3/0673; G06F 9/451; G06F 16/955; G06F 21/35; G06F 3/005; G06F 2203/0381; G06F 3/0346; G06F 3/167; G06F 3/011; G06F 16/9562; G06F 3/0304; G06F 3/04817; G06F 3/0485; G06F 1/163; G06F 16/40; G06F 16/60; G06F 16/634; G06F 16/68; G06F 16/683; G06F 16/70; G06F 1/3206; G06F 1/3231; G06F 1/324; G06F 1/329; G06F 2221/2111; G06F 2221/2117; G06F 3/002; G06F 3/012; G06F 3/016; G06F 3/147; G06F 40/211; G06F 40/35; G06F 8/20; G06F 8/54; G06F 8/60; G06F 9/445; G06F 9/44521; G06F 9/4484; G06F 9/45504; G06F 9/45529; G06F 9/45537; G06F 2203/0331; G06F 3/14; G06F 3/165; H05B 47/105; H05B 47/19
See application file for complete search history.

(56) References Cited

U.S. PATENT DOCUMENTS

| | | | |
|---|---|---|---|
| 2018/0141750 A1* | 5/2018 | Hasegawa | G11B 15/689 |
| 2018/0233145 A1* | 8/2018 | Bathiche | G06F 3/017 |
| 2018/0308517 A1* | 10/2018 | Goodman | G11B 15/689 |
| 2019/0275671 A1* | 9/2019 | Natarajan | G06N 20/00 |
| 2019/0369975 A1* | 12/2019 | Maor | G06F 11/3624 |

* cited by examiner

1200

| Group identification information | Library identification information | StartTime | Pattern |
|---|---|---|---|
| 1210 — ALL | 001 | 19:01 | RGB / ON_15 / OFF_15 / REPEAT_30 |
| 1220 { GROUP1 | 002 | 19:50 | R / GRAD_10 / B / REPEAT_60 |
| GROUP2 | 002 | 19:50 | B / GRAD_10 / G / REPEAT_60 |
| GROUP3 | 002 | 19:50 | G / GRAD_10 / R / REPEAT_60 |
| 1230 { GROUP1 | 003 | 20:35 | R / BLINK_30 / OFF |
| GROUP2 | 003 | 20:35 | OFF_30 / B / BLINK_30 / OFF |
| GROUP3 | 003 | 20:35 | OFF_60 / G / BLINK_30 / OFF |
| 1240 — ALL | 004 | NULL | RGB / REPEAT_30 |
| 1250 { GROUP1 | 005 | NULL | RGB / BLINK |
| GROUP2 | 005 | NULL | GRB / BLINK |
| GROUP3 | 005 | NULL | BRG / BLINK |

LED Off
BLE Off
Standalone mode Off

| Stand Alone | A | 58a |
|---|---|---|
| | B | 58b |
| | C | 58c |
| | D | 58d |

LIGHTING DEVICE AND PERFORMANCE SYSTEM COMPRISING SAME

CROSS-REFERENCE TO RELATED APPLICATIONS

The present application is a continuation of U.S. patent application Ser. No. 16/772,089, filed on Jun. 11, 2020, which is a U.S. National Phase of International Patent Application No. PCT/KR2018/001839, filed on Feb. 12, 2018, which claims the benefit and priority of U.S. Provisional Patent Application No. 62/597,438 filed Dec. 12, 2017 and Korean Patent Application No. 10-2018-0006309 filed on Jan. 17, 2018. The contents of the above applications are incorporated herein by reference in their entirety.

BACKGROUND OF THE INVENTION

1. Technical Field

The present disclosure relates to a lighting device and a performance system including the same.

2. Description of the Related Art

Lighting devices may be deployed in a performance hall, a music concert, or an art gallery where many people gather, in order to guide a performance, to instruct a movement in a space, or for aesthetic cheer.

In particular, a lighting device provided to each individual may operate in a different manner in accordance with a specific location in the space or the individual to which the lighting device is provided.

In case that a large number of lighting devices are deployed in a wide space, it is necessary to transfer information to respective lighting devices at an accurate time in order to control the lighting devices.

In particular, in order for the lighting devices to operate accurately in such a transfer method, a technology is necessary, which enables a plurality of lighting devices to operate simultaneously. In particular, in order to control lighting devices so that a very large number of lighting devices, for example, several tens or hundreds of thousands of lighting devices, operate without any temporal difference, close operations among the lighting devices and a control device and their preprocessing are necessary.

SUMMARY OF THE INVENTION

An aspect of the present disclosure is to prevent an omission of a message for controlling lighting devices in a space where a plurality of lighting devices are distributed and to finely control the operation timing among the plurality of lighting devices.

Another aspect of the present disclosure is to effectively control a plurality of lighting devices using light output patterns pre-stored in the lighting devices in accordance with a low-capacity control message.

In accordance with an embodiment of the present disclosure, a lighting device includes: a light source unit; a first communication unit configured to receive library data from a mobile terminal; a storage unit configured to store the library data; a second communication unit configured to receive a control message indicating an execution command of a library corresponding to the library data from a control device; and a processor configured to control the light source unit to execute the library in accordance with the control message, wherein the processor is configured to control an operation timing of the light source unit by sequentially receiving the control message over a predetermined number of times at an initial execution of the library.

In accordance with an embodiment of the present disclosure, a performance system includes: a control device configured to generate a control message indicating an execution command of a library; a transmission device configured to transmit the generated control message; a plurality of repeaters configured to transfer the control message, received from the transmission device, in a broadcasting method; and a plurality of lighting devices configured to store library data corresponding to the library and to execute the library using the stored library data in accordance with the control message received from the repeaters, wherein each of the plurality of lighting devices is configured to control an operation timing of a light source unit by sequentially receiving the control message over a predetermined number of times at an initial execution of the library.

According to various embodiments of the present disclosure, even if a plurality of lighting devices are distributed, such that the message is omitted, the operations of the plurality of lighting devices can be synchronized without time delay.

Further, according to various embodiments of the present disclosure, because the lighting device stores predetermined light output patterns, the control device can transmit a small-capacity message to the lighting device, and thus the message transfer can be efficiently performed.

DETAILED DESCRIPTION

Hereinafter, embodiments related to the present disclosure will be described in more detail with reference to the accompanying drawings. In the following description, suffixes " . . . module" and " . . . unit" for constituent elements, as used herein, are given or are interchangeably used in consideration of only easiness in preparing the description, but do not have mutually distinctive meanings or roles.

In the description, a device, which is carried by or is provided to an individual, emits light in various patters, and includes an auxiliary vibration function, is called a lighting device. The lighting device may be possessed by a user who watches a performance in a performance hall or a music concert, or may be fixed to a seat of each user to be provided to the user.

Next, a form in which a lighting device emits light, blinks, or additionally provides vibrations is called a pattern, and one or more patterns are combined with each other, which is called a scenario.

The scenario enables an image designed by a promoter to be expressed using light output by lighting devices.

For example, one scenario may correspond to a song. Accordingly, a playback time of one scenario may be equal to a playback time of a song.

The scenario may be composed of a plurality of libraries. Each of the plurality of libraries may correspond to a partial playback interval of the scenario.

Scenario data may include information necessary to execute the scenario.

The scenario data may include a plurality of pieces of library data.

Figure 1:
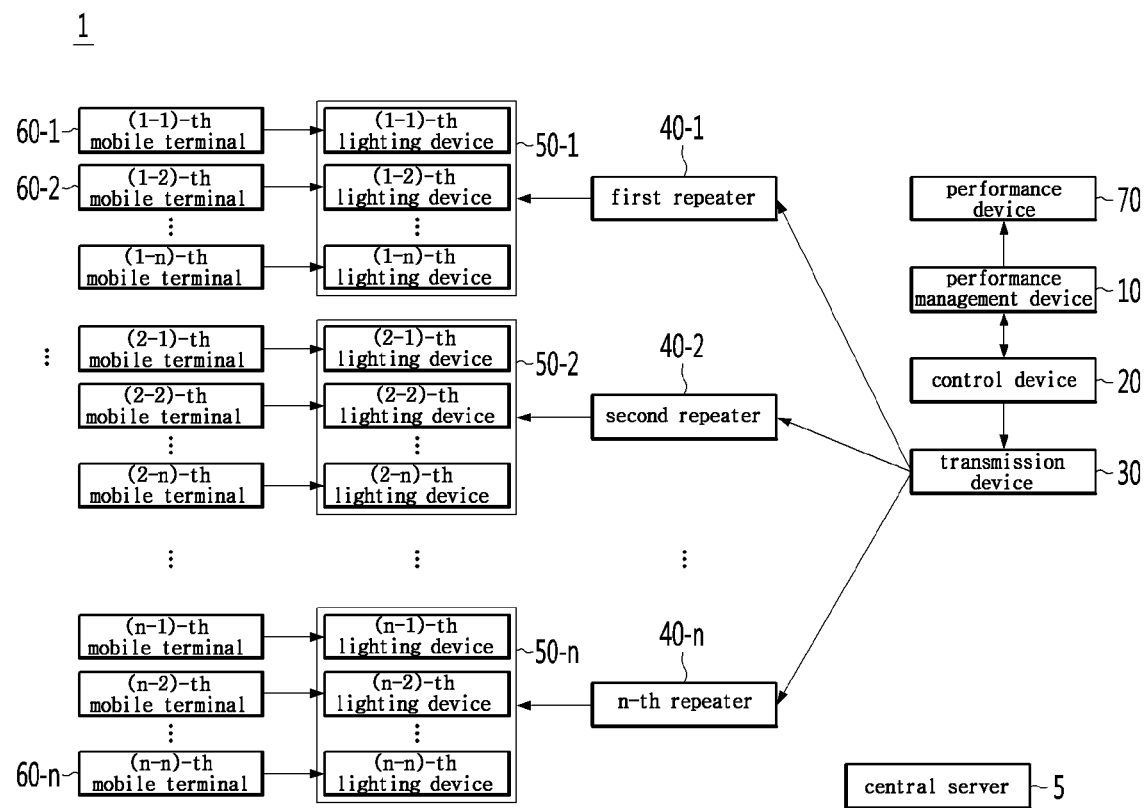
FIG. 1 is a block diagram explaining a performance system according to an embodiment of the present disclosure.
Figure 2:
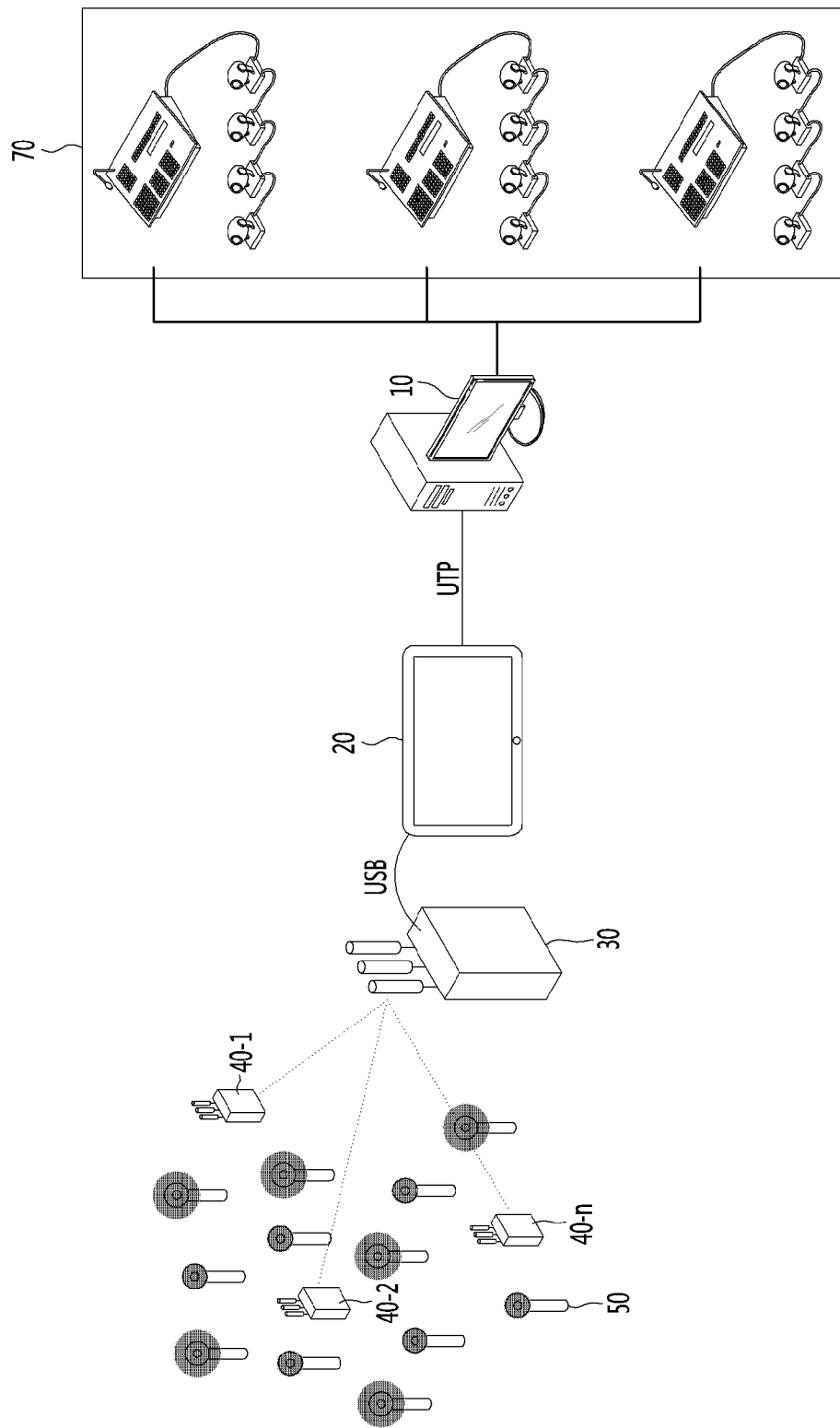
FIG. 2 is a diagram expressing in detail the configuration of the performance system according to an embodiment of the present disclosure.

FIG. 1 is a block diagram explaining a performance system according to an embodiment of the present disclosure, and FIG. 2 is a diagram expressing in detail the configuration of the performance system according to an embodiment of the present disclosure.

Referring to FIGS. 1 and 2, a performance system 1 according to an embodiment of the present disclosure may include a central server 5, a performance management device 10, a control device 20, a transmission device 30, a plurality of repeaters 40-1 to 40-n, a plurality of lighting groups 50-1 to 50-n, a plurality of mobile terminals 60-1 to 60-n, and a performance device 70.

The central server 5 may generate and store a scenario. The scenario may be designed by a performance promoter. The promoter may generate the scenario through a computing device which is included in the central server 5 or is composed separately from the central server 5.

Later, a mobile terminal 60 and the control device 20 may download scenario data corresponding to a scenario from the central server 5.

The performance management device 10 may be a device that manages operations of a sound device and an illumination device which constitute a stage.

The performance management device 10 may transfer timing signals for outputting sound and illumination, respectively, at a specific time to the sound device and the illumination device.

The control device 20 may receive a scenario from the central server 5, and may transmit, to the transmission device 30, a control message for operating a lighting device 50 in accordance with the received scenario.

The transmission device 30 may transmit the control message, transferred from the control device 20, to the plurality of repeaters 40-1 to 40-n.

Although the transmission device 30 has been explained as a separate configuration, this is merely an example, and the transmission device 30 may be included in the control device 20.

The plurality of repeaters 40-1 to 40-n may transmit the control message, transferred from the transmission device 30, to the plurality of lighting groups 50-1 to 50-n.

The reason why the plurality of repeaters 40-1 to 40-n are necessary is that the control message may not be properly transmitted to the respective lighting devices 50 in case that a performance hall is large-scaled.

Each of the plurality of repeaters 40-1 to 40-n may transmit the control message to the adjacent lighting groups in a broadcasting method. The broadcasting method may be a message transmission method in which receivers are not designated.

Each of the plurality of lighting groups 50-1 to 50-n may include a plurality of lighting devices.

Each of the plurality of mobile terminals 60-1 to 60-n may be paired to each of the plurality of lighting devices. A user may possess the mobile terminal and the lighting device 50.

The mobile terminal 60 may receive a scenario from the central server 5.

The performance device 70 may include the sound device for outputting sound, the illumination device for outputting illumination, and an image display device for outputting an image.

Operations between respective constituent elements constituting the performance system 1 will be described later.

Figure 3:
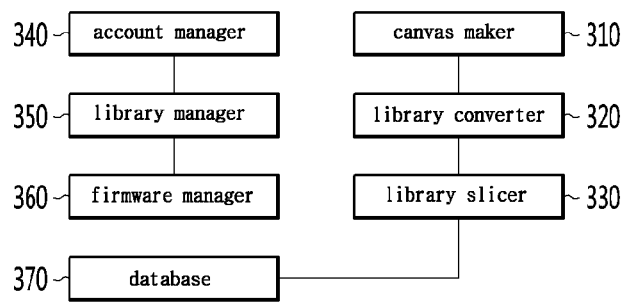
FIG. 3 is a block diagram explaining the configuration of a central server according to an embodiment of the present disclosure.

FIG. 3 is a block diagram explaining the configuration of a central server according to an embodiment of the present disclosure.

Referring to FIG. 3, the central server 5 may include a canvas maker 310, a library converter 320, a library slicer 330, an account manager 340, a library manager 350, a firmware manager 360, and a database 370.

The canvas maker 310 may generate a seat map of a performance. Further, the canvas maker 310 may map a ticket identifier to each of a plurality of seats constituting the seat map. The ticket identifier may be a seat number for identifying a seat.

Each of the plurality of seats may be called one pixel.

The library converter 320 may give colors to a plurality of pixels constituting the seat map using an image intended to be implemented from the lighting devices.

That is, in order to express a plurality of scenes constituting the image, colors corresponding to the scenes may be given to the plurality of pixels.

The library converter 320 may convert the image into a dot animation based on the colors given to the plurality of pixels.

The library slicer 330 may separate data for all directions being used for a performance time into the plurality of pixels based on the dot animation. The data for the directions may include information about the colors that should be expressed by the respective pixels and time for expressing the colors.

The account manager 340 may manage a plurality of accounts. Each of the plurality of accounts may correspond to an account of each of a plurality of promoters.

The library manager 350 may manage the operations of the canvas maker 310, the library converter 320, and the library slicer 330.

The library manager 350 may generate the plurality of libraries as one scenario.

The firmware manager 360 may manage software for directing the performance.

The database 370 may store a plurality of libraries and a plurality of scenarios.

The database 370 stores the plurality of scenarios corresponding to the plurality of accounts, respectively.

Figure 4:
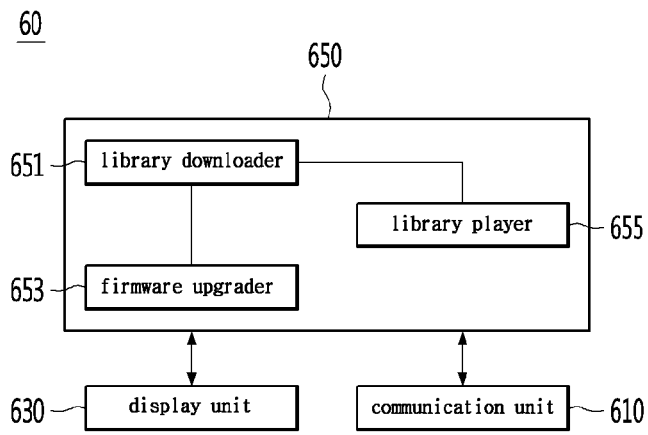
FIG. 4 is a block diagram explaining the configuration of a mobile terminal according to an embodiment of the present disclosure.

FIG. 4 is a block diagram explaining the configuration of a mobile terminal according to an embodiment of the present disclosure.

Referring to FIG. 4, the mobile terminal 60 according to an embodiment of the present disclosure may include a communication unit 610, a display unit 630, and a controller 650.

The communication unit 610 may receive, from the central server 5, scenario data corresponding to a scenario and firmware for executing an application using the scenario data.

The communication unit 610 may transmit the scenario data and the firmware to the lighting device 50.

The communication unit 610 may transmit or receive information to or from at least one of a base station, an external terminal, and a server on a mobile communication network constructed in accordance with technical standards for mobile communication or communication schemes (e.g., global system for mobile communication (GSM), code division multi-access (CDMA), code division multi-access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), and long term evolution-advanced (LTE-A)).

The communication unit 610 may transmit or receive information to or from the lighting device 50 using radio frequency (RF) communication, such as Bluetooth, Bluetooth low energy (BLE), WiFi, ZigBee, or UWB.

The controller 650 may control the overall operation of the mobile terminal 60.

The controller 650 may include a library downloader 651, a firmware upgrader 653, and a library player 655.

The library downloader 651 may download the scenario data and library data from the central server 5 through the communication unit 610.

The firmware upgrader 653 may upgrade the existing firmware to a new version of firmware in case that the communication unit 610 receives the new version of firmware using the firmware received from the central server 5.

The library player 655 may play a scenario that the lighting device 50 being paired to the mobile terminal 60 should perform for a performance time.

Through this, a user may pre-identify the operation that should be performed by the user's own lighting device 50 during the performance time.

Figure 5:
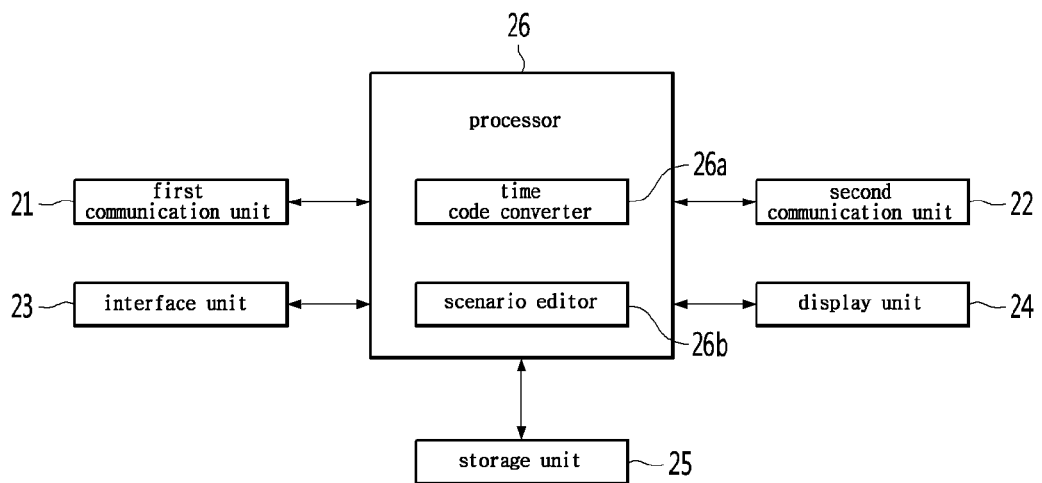
FIG. 5 is a block diagram explaining the configuration of a control device according to an embodiment of the present disclosure.

FIG. 5 is a block diagram explaining the configuration of a control device according to an embodiment of the present disclosure.

The control device 20 is a device that is possessed by a promoter or a manager who controls the operation of the lighting device 50 in a performance hall or a music concert, and may be a computer, a smart phone, or a tablet computer.

Referring to FIG. 5, the control device 20 may include a first communication unit 21, a second communication unit 22, an interface unit 23, a display unit 24, a storage unit 25, and a processor 26.

The first communication unit 21 may communicate with the transmission device 30. The first communication unit 21 may use the universal serial bus (USB) standard in order to perform communication with the transmission device 30.

The first communication unit 21 may transmit a control message to the transmission device 30. The control message may be a message for starting a library constituting a scenario.

As another example, the control message may be a message for stopping the currently operating library.

As still another example, the control message may be a message for executing a library having a pattern that is different from the pattern of the library stored in the lighting device 50.

The second communication unit 22 may perform communication with the central server 5 or the performance management device 10.

The second communication unit 22 may receive scenario data from the central server 5.

The interface unit 23 may receive a user input. The interface unit 23 may receive the user input for transmitting the control message to the transmission device 30.

The interface unit 23 may include a touch key and a push key.

The display unit 24 may output the stored scenario through simulating the same. A user may identify whether the lighting devices operate properly in accordance with the scenario through the simulation.

The storage unit 25 may store the scenario and the control message.

The processor 26 may control the overall operation of the control device 20.

The processor 26 may generate the control message, and may transmit the generated control message to the transmission device through the second communication unit 22.

The processor 26 may include a time code converter 26a and a scenario editor 26b.

The time code converter 26a may convert the control message into a time code. The time code may be a code for synchronizing the lighting groups 50-1 to 50-n.

The scenario editor 26b may generate and edit scenarios to be performed by the lighting devices in accordance with a user input.

Figure 6:
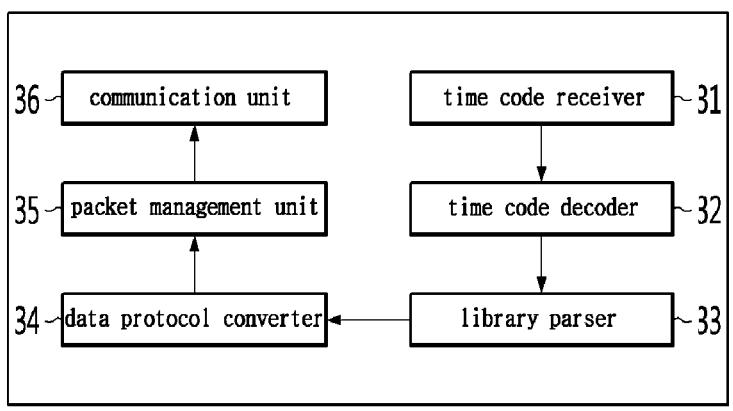
FIG. 6 is a block diagram explaining the configuration of a transmission device according to an embodiment of the present disclosure.

FIG. 6 is a block diagram explaining the configuration of a transmission device according to an embodiment of the present disclosure.

The transmission device 30 may include a time code receiver 31, a time code decoder 32, a library parser 33, a data protocol converter 34, a packet management unit 35, and a communication unit 36.

The time code receiver 31 may receive an analog type time code from the control device 20.

The time code decoder 32 may decode the analog type time code to digital type frame data. The frame data may include information on hour/minute/second.

The library parser 33 may acquire library identification information for identifying a library, which should be currently performed, by parsing the decoded time code.

The data protocol converter 34 may convert a communication protocol to transmit the acquired library identification information, and may transfer the converted packet to the packet management unit 35.

The packet management unit 35 may transfer the received packet to the communication unit 36.

The packet management unit 35 may generate a plurality of control messages. Each of the plurality of control messages may include the same library identification information.

Sequence numbers may be given to each of the plurality of control messages so that the control messages are transmitted at predetermined intervals.

The plurality of control messages may indicate execution commands for libraries being transmitted to the lighting devices 50.

The plurality of control messages may be named retransmission packets.

Transmission of the retransmission packets will be described with reference to FIGS. 13A and 13B.

The packet management unit 35 may minimize a loss of the control message, and may generate a synchronization packet to adjust the timing that may be distorted.

The synchronization packet may be a packet to identify whether the lighting device 50 well follows the execution of the library and to match an execution synchronization of the library.

The synchronization packet may be periodically generated until the execution of the library is ended after the transmission of the retransmission packet.

The communication unit 36 may transmit the packets, transferred from the packet management unit 35, to the plurality of repeaters 40-1 to 40-n, using the RF communication.

Figure 7:
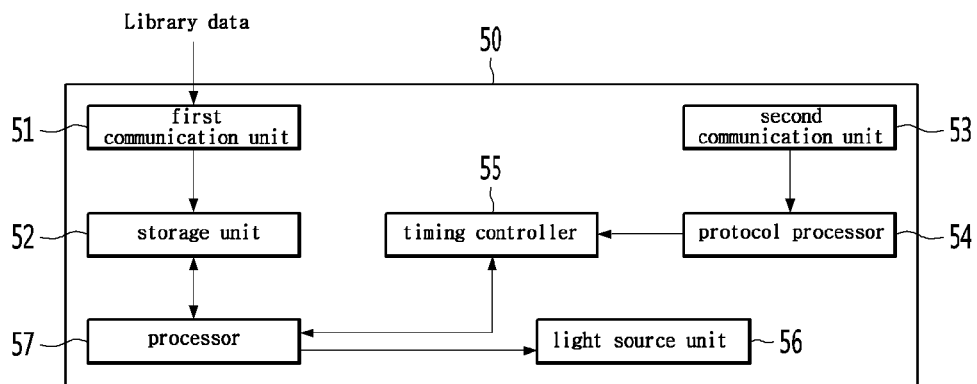
FIG. 7 is a diagram explaining the configuration of a lighting device according to an embodiment of the present disclosure.

FIG. 7 is a diagram explaining the configuration of a lighting device according to an embodiment of the present disclosure.

Referring to FIG. 7, the lighting device 50 may include a first communication unit 51, a storage unit 52, a second communication unit 53, a protocol processor 54, a timing controller 55, a light source unit 56, and a processor 57.

The first communication unit 51 may receive scenario data or library data from the mobile terminal 60.

The first communication unit 51 may include a BLE module or a wireless communication module using IEEE 802.15.4 standards. However, the first communication unit 51 is not necessarily limited thereto, but may receive the scenario data via wire.

The storage unit 52 may store the received scenario data or library data.

A user may pre-store the scenario data in the lighting device 50 at home, instead of a performance hall, or may store the scenario data in the lighting device 50 in a performance hall.

The second communication unit 53 may receive the control message from the transmission device 30.

The second communication unit 53 may transmit or receive information to or from the repeaters using radio frequency (RF) communication, such as Bluetooth, Bluetooth low energy (BLE), WiFi, ZigBee, or UWB.

The protocol processor 54 may discriminate the type of the message or the packet received by the second communication unit 53. If the received message is the control message, retransmission packet, or sync packet, the protocol processor 54 may transfer the same to the timing controller 55.

If the retransmission packet is received, the timing controller 55 may control the operation timing of the lighting device 50 based on respective sequences of the plurality of control messages included in the received retransmission packet.

If the sync packet is received, the timing controller 55 may control the operation timing of the lighting device 50 based on the received sync packet.

The sync packet may be called a synchronization packet. The details thereof will be described later.

In FIG. 7, although the timing controller 55 has been described as a separate configuration, this is merely an example, and the timing controller 55 may be included in the configuration of the processor 57.

The light source unit 56 may perform an operation of emitting light having a specific color, blinking, or controlling brightness, in accordance with the information stored in the storage unit 52 under the control of the processor 57.

The light source unit 56 may be composed of LEDs, but this is merely an example, and the light source unit 56 may also be composed of a specific light-emitting material.

The processor 57 may control the overall operation of the lighting device 50.

The processor 57 may control the operation of the light source unit 56 in accordance with the scenario data stored in the storage unit 52 and the control message received by the second communication unit 53.

The processor 57 may determine what library of scenario is to be played based on the received control message.

That is, the processor 57 may determine which of the plurality of libraries constituting the scenario is to be executed, by parsing the control message.

The processor 57 may control the light source unit 56 to operate in accordance with the determined library.

In particular, based on library identification information included in the control message, the processor 57 may search for a pattern corresponding to the library identification information through the storage unit 52, and may control the light source unit 56 to output the corresponding pattern.

Figure 8:
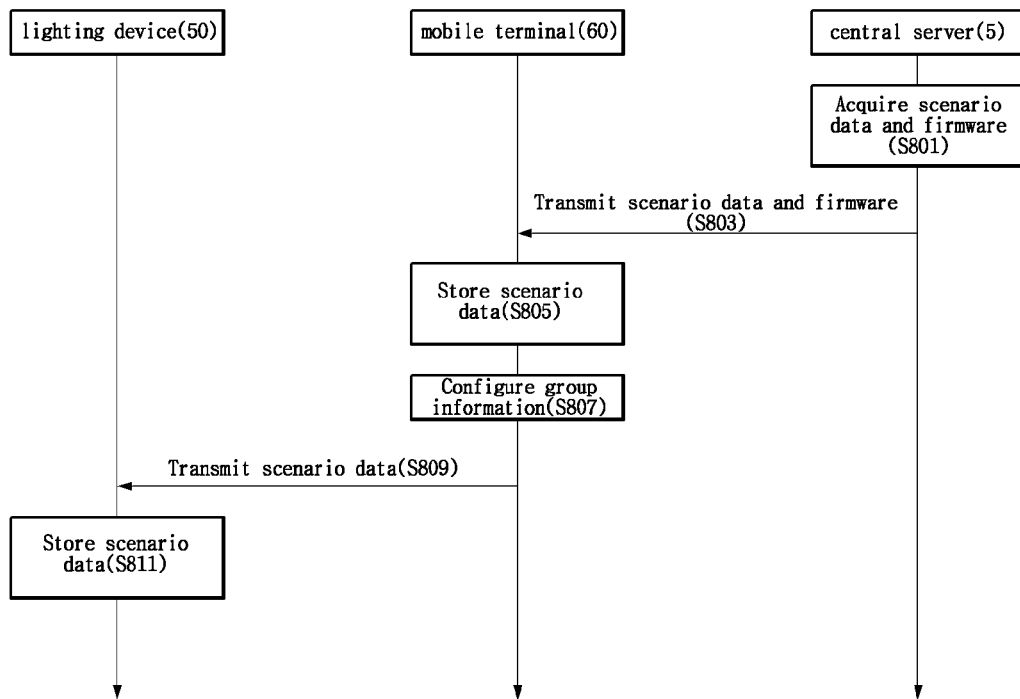
FIG. 8 is a ladder diagram explaining an operational relationship among a central server, a mobile terminal, and a lighting device according to an embodiment of the present disclosure.

FIG. 8 is a ladder diagram explaining an operational relationship among a central server, a mobile terminal, and a lighting device according to an embodiment of the present disclosure.

The central server 5 acquires scenario data and firmware capable of performing a scenario corresponding to the scenario data (S801), and transmits the acquired scenario data and the firmware to the mobile terminal 60 (S803).

The mobile terminal 60 stores the scenario data and the firmware received from the central server 5 (S805).

The mobile terminal 60 may install an application using the received firmware. The application may be used to transmit the scenario data to the lighting device 50.

The mobile terminal 60 configures group information of the scenario to be performed by the lighting device 50 (S807).

The group information may be information corresponding to a user's seats. The group information may be information for identifying the lighting group described above with reference to FIG. 1.

The group information may be configured by a user in a QR code tagging method through a ticket number or a ticket seat number using an application installed in the mobile terminal 60.

After configuring the group information, the mobile terminal 60 transmits the scenario data to the lighting device 50 (S809).

In an embodiment, the mobile terminal 60 may transmit the scenario data of all the lighting groups to the lighting device 50.

As another example, the mobile terminal 60 may transmit the scenario data corresponding to the configured group information.

The lighting device 50 stores the scenario data received from the mobile terminal 60 (S811).

The mobile terminal 60 may also transmit the firmware to the lighting device 50 in addition to the scenario data.

Accordingly, the lighting device 50 may be driven in accordance with the received firmware.

Figure 9:
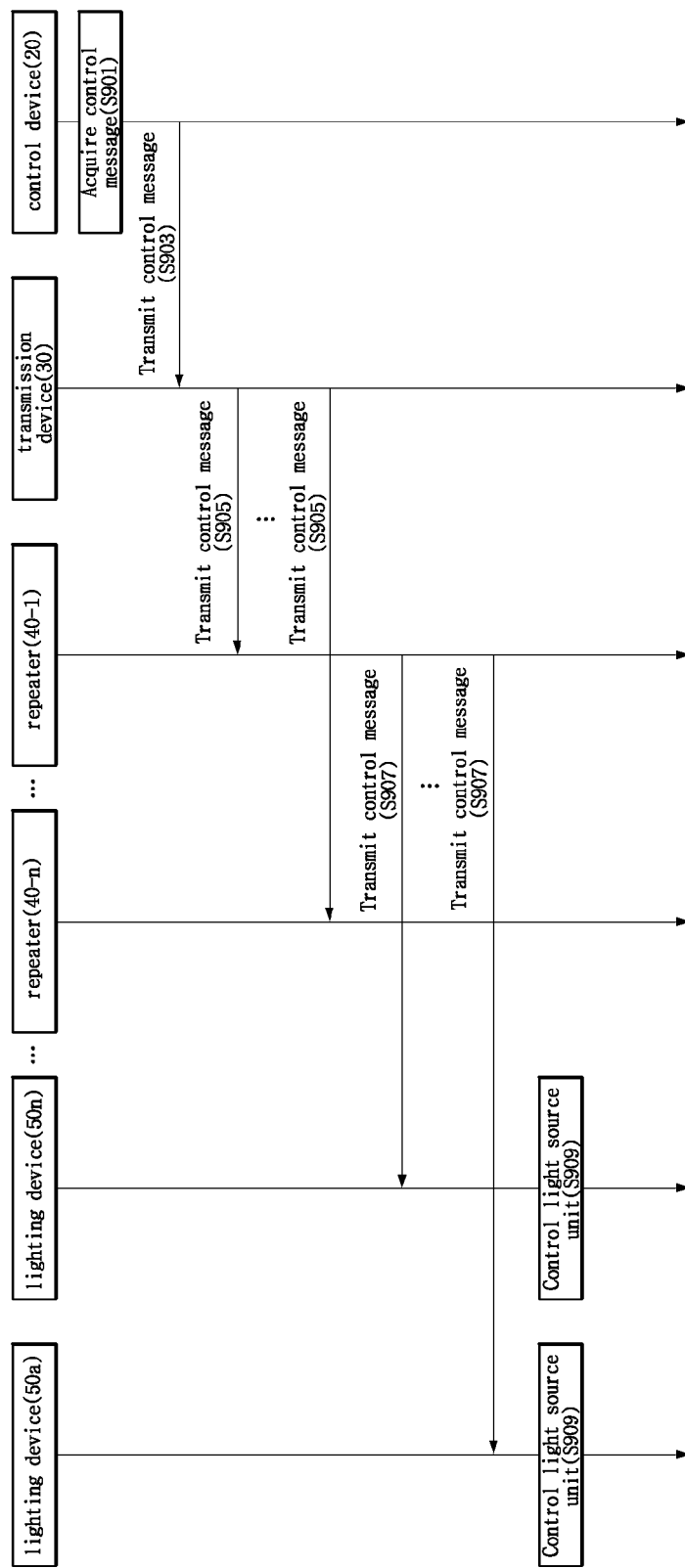
FIG. 9 is a ladder diagram explaining a process in which a control message used by lighting devices to execute a scenario is transmitted according to an embodiment of the present disclosure.

FIG. 9 is a ladder diagram explaining a process in which a control message used by lighting devices to execute a scenario is transmitted according to an embodiment of the present disclosure.

The control device 20 acquires a control message to be transmitted to the plurality of lighting devices 50-1 to 50-*n* (S901).

In an embodiment, the control message may be a message indicating a scenario execution command.

For example, if one scenario corresponds to a song sung by a singer, the control device 20 may generate the control message for executing the scenario to be performed for a playback time of the song.

The control device 20 transmits the acquired control message to the transmission device 30 (S903).

The transmission device 30 transmits the acquired control message to the plurality of repeaters 40-1 to 40-*n* (S905).

The plurality of repeaters 40-1 to 40-*n* transmit the control message, transmitted from the transmission device 30, to the plurality of lighting devices 50-1 to 50-*n*, respectively (S907).

In an embodiment, the plurality of repeaters 40-1 to 40-*n* may transmit the control message to the plurality of lighting devices 50-1 to 50-*n*, respectively, in a broadcasting method in which receivers are not designated.

The plurality of lighting devices 50-1 to 50-*n* control the operations of the light source units 56, respectively, in accordance with the received control message (S909).

Next, a scenario and data constituting the scenario according to an embodiment of the present disclosure will be described.

Figure 10:
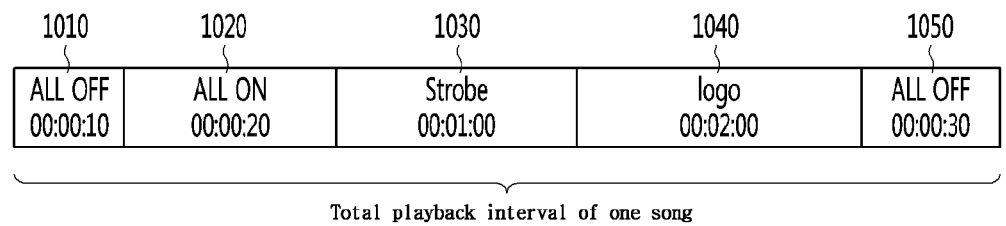
FIG. 10 is a diagram illustrating an example of a scenario according to an embodiment of the present disclosure.
Figure 11:
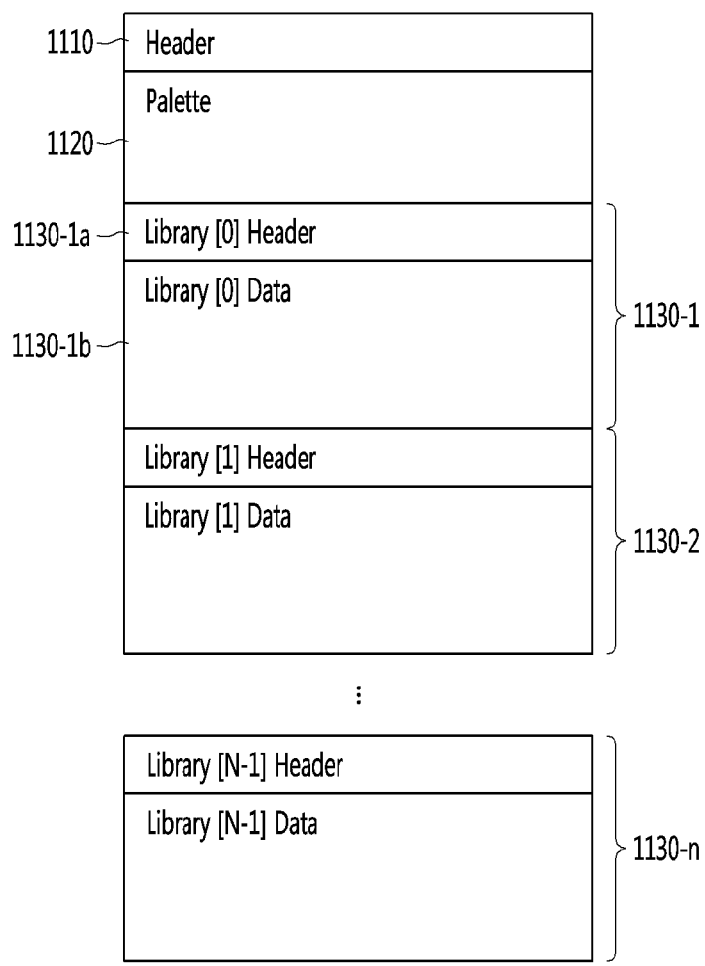
FIG. 11 is a diagram illustrating the actual configuration of scenario data according to an embodiment of the present disclosure.

FIG. 10 is a diagram illustrating an example of a scenario according to an embodiment of the present disclosure, and FIG. 11 is a diagram illustrating the actual configuration of scenario data according to an embodiment of the present disclosure.

FIG. 10 shows an example of a scenario 1000 corresponding to a playback interval of one song.

One scenario 1000 may include a plurality of libraries 1010, 1020, 1030, 1040, and 1050.

A scenario promoter may design the scenario by dividing the total playback interval of one song into a plurality of intervals through the control device 20 or the central server 5.

It is assumed that the total playback time of one song is four minutes.

The plurality of intervals may correspond to the plurality of libraries 1010 to 1050, respectively.

A first library 1010 may indicate that the light source units 56 of all the lighting devices should be turned off for 10 seconds from a start of a song.

A second library 1020 may indicate that the light source units 56 of all the lighting devices should be turned on for 20 seconds after performing the first library 1010.

A third library 1030 may indicate that the light source units 56 of all the lighting devices should perform strobe operations for one minute after performing the second library 1020.

A fourth library 1040 may indicate that the light source units 56 of all the lighting devices should output light to express a logo of a singer for two minutes after performing the third library 1030.

A fifth library 1050 may indicate that the light source units 56 of all the lighting devices should be turned off for 30 seconds after performing the fourth library 1040.

As described above, one scenario may be completed through combination of the first to fifth libraries 1010, 1020, 1030, 1040, and 1050.

The control message that the control device 20 transmits to all the lighting devices through the transmission device 30 and the plurality of repeaters 40-1 to 40-*n* may be the scenario execution command.

In another embodiment, the control message that the control device 20 transmits to all the lighting devices through the transmission device 30 and the plurality of repeaters 40-1 to 40-*n* may be a command for executing one library constituting a scenario.

Referring to FIG. 11, the structure of scenario data 1100 corresponding to the scenario 1000 is illustrated.

The scenario data 1100 may include a header 1110, a palette field 1120, and a plurality of library fields 1130-1 to 1130-*n*.

The palette field 1120 may include information on a color table capable of expressing 256 colors. The color table may include index values corresponding to the 256 colors, respectively. In this case, the color table may have a size of 1 byte.

The library data to be described later may include the index values included in the color table.

Each of the plurality of library fields 1130-1 to 1130-*n* may include a library header and a library data.

For example, a first library field 1130-1 may include a first library header 1130-1*a* and first library data 1130-1*b*.

The first library data 1130-1*b* may correspond to the first library 1010 of FIG. 10.

Each library data may include information on one or more of group identification information, library identification information, a lighting group operation start time, a lighting group operation end time, color information that should be output by the lighting group, and a pattern that should be output by the lighting group.

Information contained in each library data will be described in detail with reference to FIG. 12.

Figures 12, 13A:
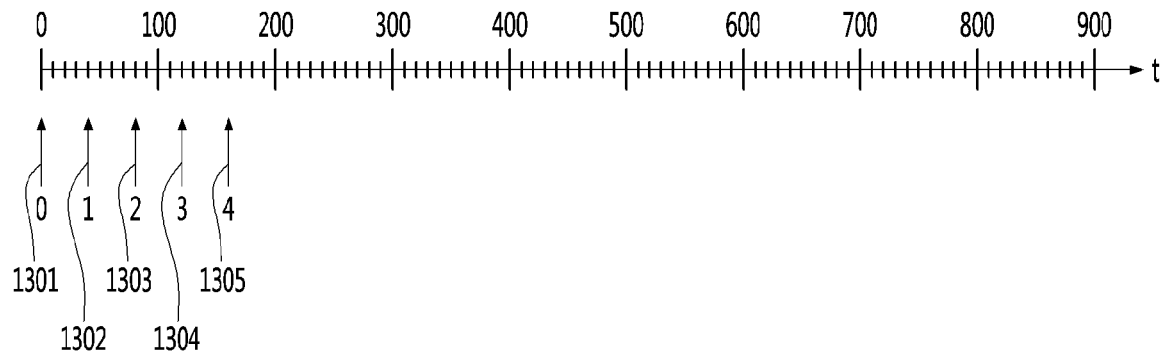
FIG. 12 is a diagram explaining information included in scenario data according to an embodiment of the present disclosure.
FIGS. 13A and 13B are diagrams explaining an example in which a lighting device controls the timing in accordance with repeated reception of a control message according to an embodiment of the present disclosure.

FIG. 12 is a diagram explaining information included in scenario data according to an embodiment of the present disclosure.

Referring to FIG. 12, scenario data 1200 may include a plurality of library data 1210 to 1250.

Group identification information is information for identifying that a plurality of lighting devices deployed in a space are divided into n groups, and the respective lighting groups perform different operations.

The group identification information may be used as information for identifying the lighting group described above with reference to FIG. 1.

If the group identification information is "ALL", it may indicate that all the lighting groups perform the same library.

The library identification information is information that is included in case that the control device 20 commands the respective lighting devices to operate in accordance with a specific library.

For example, if the control device 20 transmits a control message "library 002 operation", the lighting device executes "002" among the library identification information.

In case that the lighting devices are divided into the plurality of groups, the lighting device 50 may operate in accordance with the configured group number.

For example, in the same manner, if the lighting device 50 belonging to a first lighting group GROUP1 and receives the command message "library 002 operation" from the control device 20, the lighting device 50 may perform a corresponding pattern "R/GRAD_10/B/Repeat 60".

Further, if the lighting device 50 belonging to a second lighting group GROUP2 and receives the command message "library 002 operation" from the control device 20, the lighting device 50 may perform a corresponding pattern "B/GRAD_30/G/Repeat 60".

Further, if the lighting device 50 belonging to a third lighting group GROUP3 and receives the command message "library 002 operation" from the control device 20, the lighting device 50 may perform a corresponding pattern "G/GRAD_30/R/Repeat 60".

"StartTime" may indicate information corresponding to a time when the library is performed.

If the StartTime is "NULL", it means that the corresponding library operates in accordance with an indication of the control message of the control device 20.

The pattern may indicate a color of light emitted by the light source unit 56, a light emitting time, a repetition period, or a blinking or turn-off period. R, G, and B indicate red, green, and blue, respectively.

In case that the light source unit 56 can adjust light more precisely, the light source unit 56 may output colors obtained by combining the R, G, and B. In case of indication with RGB 256 colors, 1 byte (8 bits) may be defined for each of the R, G, and B, and in defining the RGB, 3 bytes may be required in displaying the RGB.

The color of light output by the light source unit 56 may be configured in various types, such as, RGB, R/G/B, or specific binary number or hexadecimal number.

Further, the light source on/off and the holding time (second) may be recorded together. Further, the number of repetitions or repetition time may be configured as REPEAT.

"GRAD" means that light output by the light source unit 56 has a pattern that light is gradually changed in gradation. In an embodiment, the library "002" of the first lighting group is "R/GRAD_10/B/REPEAT_60", and this means that the color of the light output by the lighting device 50 is changed from red to blue in gradation for 10 seconds and such a change is repeated 60 times (or repeated for 60 seconds). "BLINK" indicates blinking.

Further, although not illustrated in FIG. 12, "Strobe" may indicate blinking at a higher speed than the speed of "Blink".

Figure 13B:
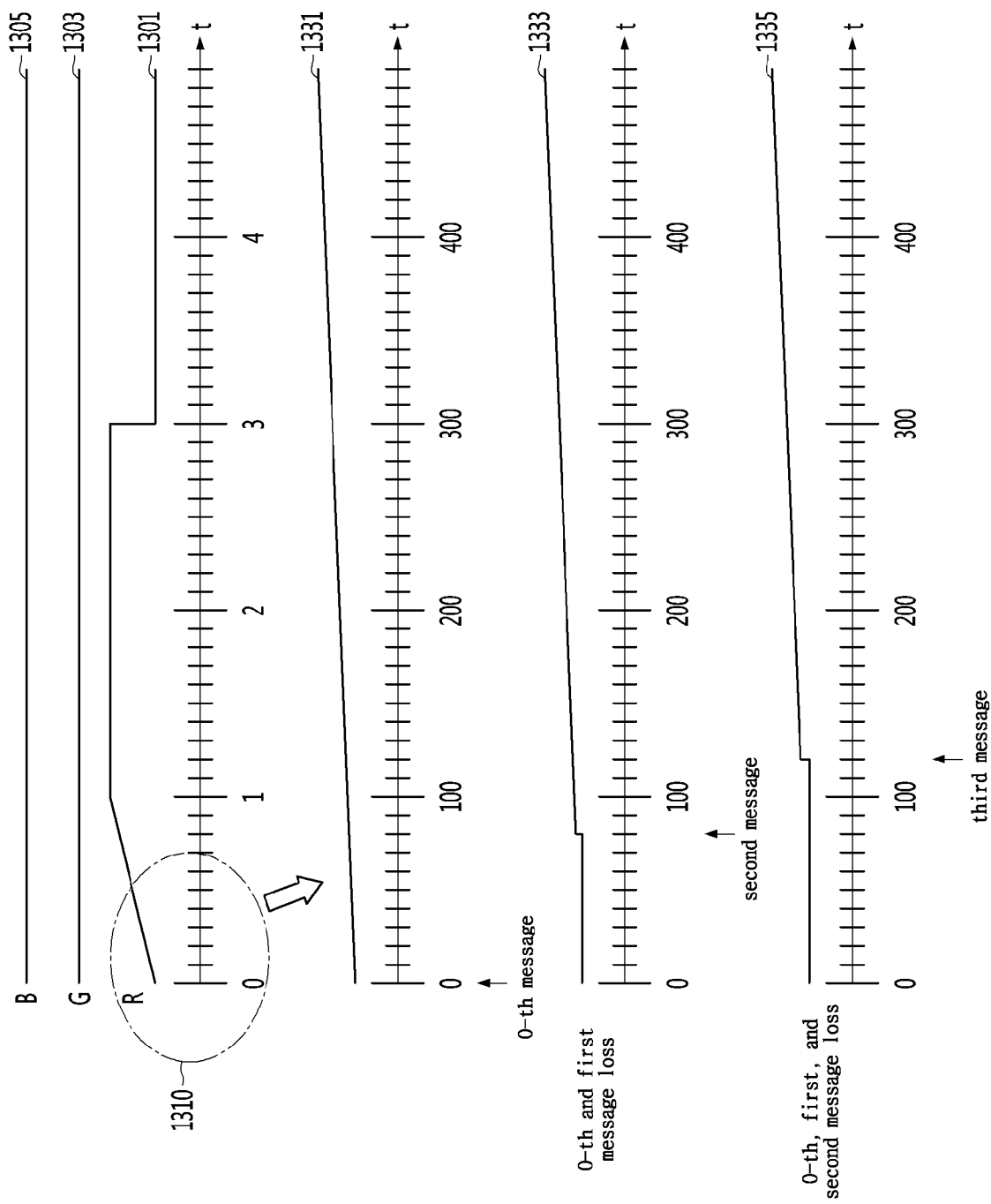

FIGS. 13A and 13B are diagrams explaining an example in which a lighting device controls the timing in accordance with repeated reception of a control message according to an embodiment of the present disclosure.

The control message may be transmitted to the lighting device 50 through a repeater 40 in a broadcasting method. In case of using a unicast method rather than the broadcasting method, the transmission device 30 needs to receive an ack message corresponding to the reception of the transmitted control message from the lighting device 50. In this case, if the ack message is received from a large number of lighting devices, a communication situation may deteriorate.

Accordingly, in an embodiment of the present disclosure, the transmission device 30 transmits the control message to the lighting device 50 in the broadcasting method.

Referring to FIG. 13, the transmission device 30 may repeatedly transmit the control message indicating an execution command of a specific library to the lighting device 50 five times.

The transmission device 30 may sequentially transmit 0-th to fourth control messages 1301 to 1305 to the lighting device 50.

The 0-th to fourth control messages 1301 to 1305 may be sequentially transmitted to the lighting device 50 in a predetermined period.

Each of the 0-th to fourth control messages 1301 to 1305 may include the same library identification information. However, the respective control messages may have different sequence numbers.

For example, when the 0-th to fourth control messages 1301 to 1305 are sequentially transmitted, the sequence number may be increased by 1.

The sequence number may indicate a transmission interval between the sequentially transmitted control messages. The transmission interval of the respective control messages may be 0.4 second, but this is merely an example.

The reason why the five control messages 1301 to 1305 are sequentially transmitted is to control even a fine timing difference among the respective lighting groups or the lighting devices in the lighting groups in a situation that the transmission of the control message may be omitted depending on the communication situation.

The omission of the transmission of the control message may indicate that the lighting device 50 is unable to receive the control message.

Referring to FIG. 13B, a pattern that should be performed by the lighting device 50 for an execution time of one library is illustrated in graph.

If it is assumed that the execution time of one library is 3 seconds, the lighting device 50 does not output blue and green (refer to 1303 and 1305), but outputs red gradually stronger for 1 second, and then maintains the output for the remaining 2 seconds (1301).

The initial 0.5 second period will be enlarged for explanation.

A first red pattern graph 1331 shows that the first lighting device gradually increases and outputs a red light in accordance with the 0-th control message 1301 in case that the first lighting device receives the 0-th control message 1301.

A second red pattern graph 1333 shows that the second lighting device gradually increases and outputs the red light in accordance with the second control message 1303 in case that the second lighting device is unable to receive the 0-th control message 1301 and the first control message 1302.

A third red pattern graph 1335 shows that the third lighting device gradually increases and outputs the red light in accordance with the third control message 1304 in case that the third lighting device is unable to receive the 0-th to second control messages 1301 to 1303.

The time when the five control messages 1301 to 1305 are sequentially transmitted is very short, and for this reason, even if some light devices are unable to receive the initial control message, the lighting devices may immediately perform the library through reception of the following control messages.

Further, the five control messages 1301 to 1305 may include sequence numbers indicating transmission intervals. The lighting device 50 having not received the initial some control messages may control the execution timing of the library using the sequence number included in the control message.

In accordance with the sequence number, the fine time difference between operations of the respective lighting devices 50 can be controlled.

Figure 14A:
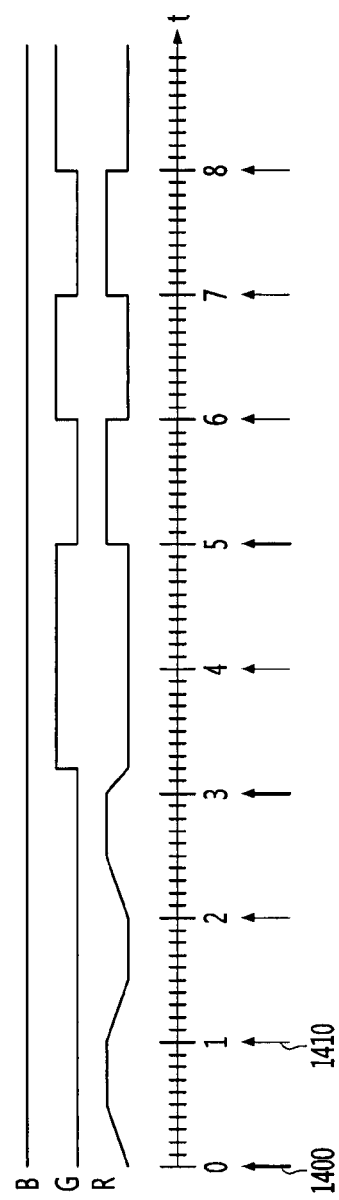
FIGS. 14A to 14C are diagrams explaining an example in which a lighting device controls the timing in accordance with repeated reception of a control message and reception of a sync packet according to an embodiment of the present disclosure.
Figure 14B:
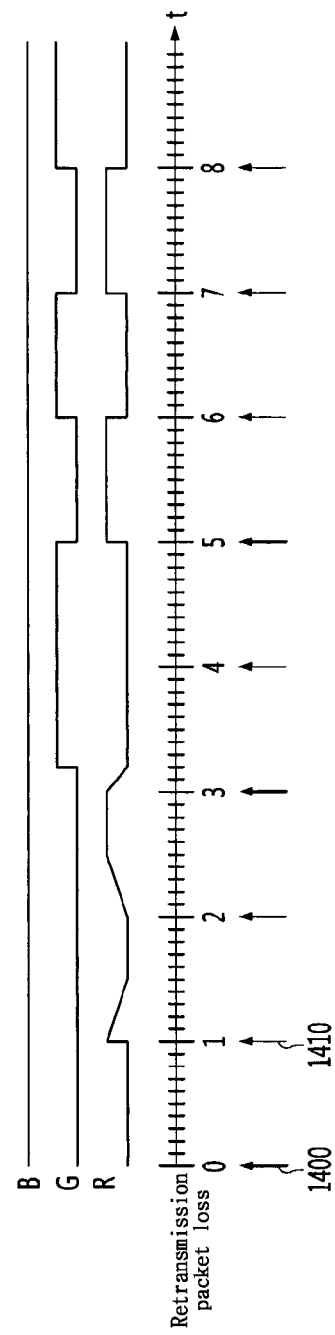
Figure 14C:
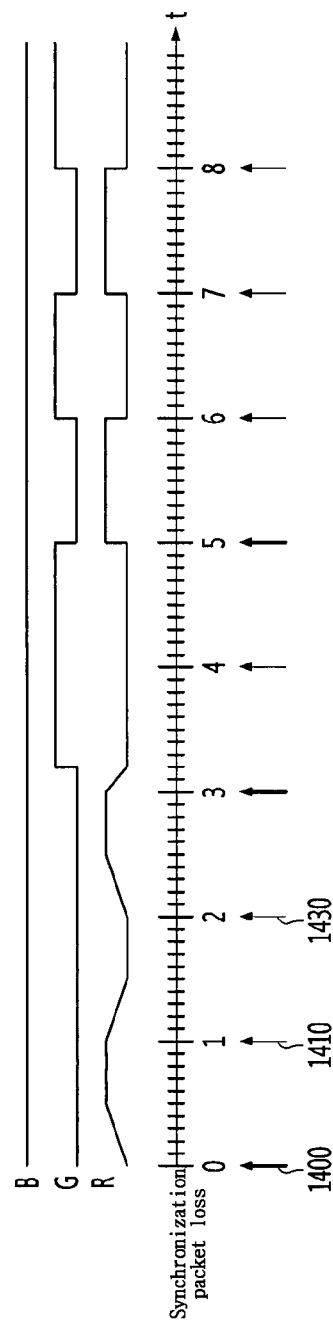

FIGS. 14A to 14C are diagrams explaining an example in which a lighting device controls the timing in accordance with repeated reception of a control message and reception of a sync packet according to an embodiment of the present disclosure.

In FIGS. 14A to 14C, it is assumed that the execution time of one library is 3 seconds.

Further, it is assumed that a bundle of the five control messages indicating the execution command of the library is a retransmission packet 1400. The five control messages have been described with reference to FIGS. 13A and 13B.

After transmitting the retransmission packet 1400, the transmission device 30 may transmit a sync packet 1410 to the respective lighting devices in each predetermined period. Further, the sync packet may be a packet for checking whether the respective lighting devices 50 well follow the execution of the library.

The sync packet may include information on one time point of a library and information on a pattern that should be performed at the corresponding one time point in order to match the operation synchronization among the respective lighting devices 50.

FIG. 14A shows a graph in which the first lighting device receives the retransmission packet 1400 and the sync packet 1410, and outputs a pattern corresponding to the library.

FIG. 14B shows a graph in which the second lighting device is unable to receive the retransmission packet 1400, but receives the first sync packet 1410, and outputs the corresponding pattern to the library from the time point when receiving the first sync packet 1410.

As illustrated in FIG. 14B, even in case that the second lighting device is unable to receive the retransmission packet 1400, the second lighting device may perform the library from the time point when receiving the first sync packet 1410 by means of the following first sync packet 1410.

FIG. 14C shows a graph in which the third lighting device receives the retransmission packet 1400 and the first sync packet 1410, but is unable to receive a second sync packet 1430, and outputs the corresponding pattern to the library.

As illustrated in FIG. 14C, even in case that the third lighting device is unable to receive the second sync packet 1430, the third lighting device may properly perform the library by means of the previously received retransmission packet 1400.

As described above, according to an embodiment of the present disclosure, even in case that the lighting device 50 is unable to receive the control message for executing the library, the lighting device 50 can immediately execute the library by means of the sync packet, and thus can effectively match the synchronization with other lighting devices.

Next, an operation mode of a lighting device will be described.

Figure 15:
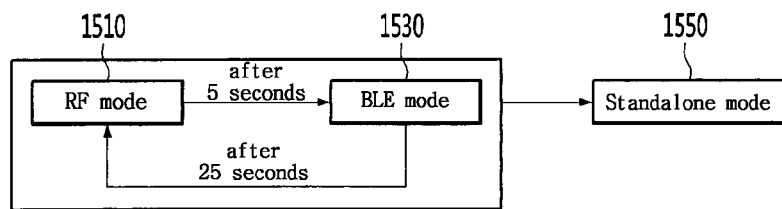
FIG. 15 is a diagram explaining an initialization operation when a lighting device is turned on according to an embodiment of the present disclosure.

FIG. 15 is a diagram explaining an initialization operation when a lighting device is turned on according to an embodiment of the present disclosure.

Hereinafter, it is assumed that operation modes of the lighting device 50 include an RF mode 1510, a BLE mode 1530, and a standalone mode 1550.

The RF mode 1510 may be a mode for performing communication with the repeater 40 using a communication protocol like ZigBee.

The BLE mode 1530 may be a mode for performing communication with the mobile terminal 60 using a low-power Bluetooth module.

The standalone mode 1550 may be a mode capable of turning on/off an output of the light source unit 56 without communication with an external device.

Referring to FIG. 15, if a power of the lighting device 50 is turned on, the lighting device 50 operates in the RF mode 1510.

After 5 seconds, the operation mode of the lighting device 50 may be switched from the RF mode 1510 to the BLE mode 1530. Again, after 25 seconds, the operation mode of the lighting device 50 may be switched from the BLE mode 1530 to the RF mode 1510.

If the lighting device 50 is unable to receive a heartbeat MSG message from the repeater being BLE-connected with the mobile terminal 60 while such a cycle is repeated n times, the operation mode of the lighting device 50 may be switched to the standalone mode 1550.

The reason why the operation mode of the lighting device 50 is changed in a power initialization process is to determine whether it is possible to take part in a performance by changing the operation mode because it is impossible to simultaneously use an RF protocol in case of using multiple RF stacks.

Next, FIG. 16 will be described.

Figure 16:
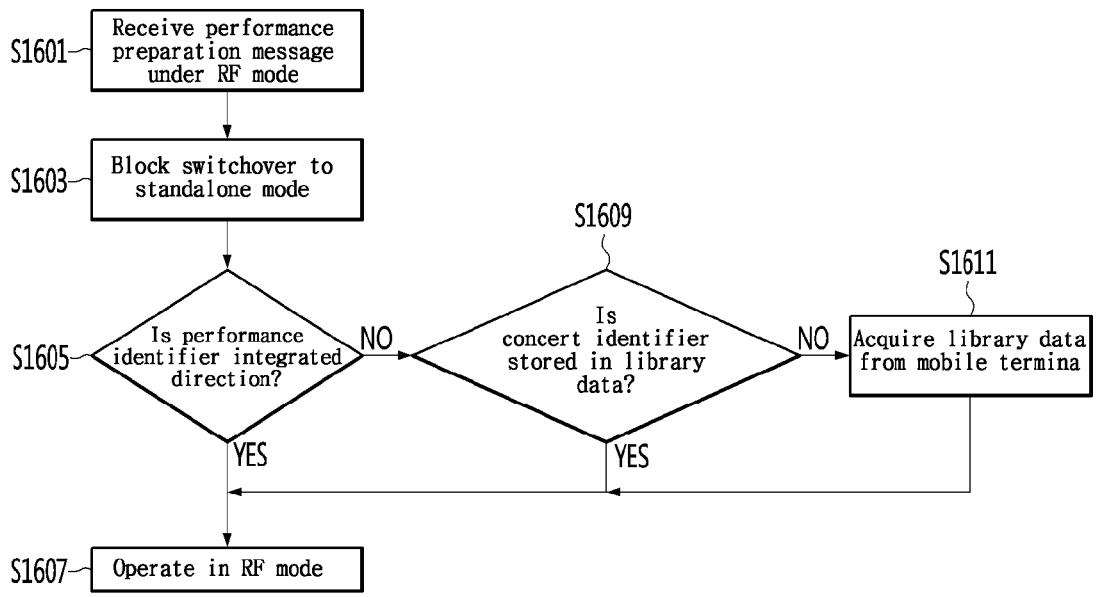
FIG. 16 is a flowchart explaining an operation process of a lighting device based on a direction type according to an embodiment of the present disclosure.

FIG. 16 is a flowchart explaining an operation process of a lighting device based on a direction type according to an embodiment of the present disclosure.

Referring to FIG. 16, the lighting device 50 receives a performance preparation message under the RF mode (S1601).

In an embodiment, the lighting device 50 may receive the performance preparation message from the repeater 40 through the control device 20.

The performance preparation message may be a message for blocking the switchover to the standalone mode. In case that a user enters a performance hall and performs an operation separately from a library, by operating the lighting device 50 in the standalone mode, direction through the lighting devices may not be properly performed.

For this, the performance preparation message may be transmitted to the respective lighting devices 50 to prevent a user from arbitrarily controlling the lighting devices 50.

In accordance with the reception of the performance preparation message, the lighting device 50 blocks the switchover to the standalone mode (S1603).

In an embodiment, the lighting device 50 may be switched from the RF mode to the BLE mode in accordance with the reception of the performance preparation message. This is because a situation may occur, in which the lighting device 50 should receive the library data or the scenario data from the mobile terminal 60.

The lighting device 50 determines whether the performance type is an integrated direction based on a performance identifier included in the performance preparation message (S1605).

In an embodiment, if the performance type is the integrated direction, all the lighting devices may be collectively controlled under the control of the control device 20. In this case, it is not necessary for the lighting device 50 to store the library data. This is because the message transmitted by the control device 20 may include detailed operation contents (light output on or off) of the lighting device 50.

If the performance type is the integrated direction, the lighting device 50 operates in the RF mode (S1607).

Accordingly, the lighting device 50 prepares to receive the control message from the control device 20.

If the performance type is an individual direction, the lighting device 50 determines whether a concert identifier included in the performance preparation message is stored (S1609).

If the performance type is the individual direction, the lighting device 50 may search whether the concert identifier included in the performance preparation message is stored in the library data of the storage unit 52.

If the concert identifier included in the performance preparation message is stored, the lighting device 50 operates in the RF mode (S1607).

If the concert identifier is not stored in the performance preparation message, the lighting device 50 acquires the library data including the corresponding concert identifier from the mobile terminal 60 (S1611).

That is, according to the embodiment of FIG. 8, the lighting device 50 may receive the library data from the mobile terminal 60.

Next, an operation of the lighting device 50 depending on whether the lighting device 50 and a cradle capable of mounting the lighting device 50 are docked with each other will be described.

Figure 17A:
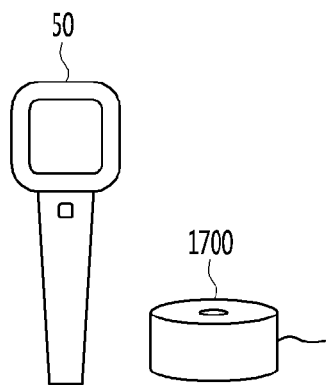
FIGS. 17A and 17B are diagrams explaining an operation of a lighting device in case that the lighting device and a cradle are not docked with each other according to an embodiment of the present disclosure.
Figure 17B:
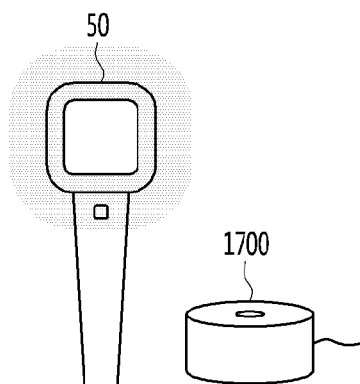

FIGS. 17A and 17B are diagrams explaining an operation of a lighting device in case that the lighting device and a cradle are not docked with each other according to an embodiment of the present disclosure.

A cradle 1700 may be a device capable of supplying power, provided from outside, to the lighting device 50 in case that the lighting device 50 is mounted on the cradle 1700.

Referring to FIG. 17A, the lighting device 50 and the cradle 1700 are separated from each other, and the power of the lighting device 50 is in an off state.

Referring to FIG. 17B, the lighting device 50 and the cradle 1700 are separated from each other, and the power of the lighting device 50 is in an on state. If the lighting device 50 operates in the standalone mode in a power-on state, it can support four cheer modes.

The four cheer modes may correspond to a plurality of buttons 58a to 58d provided on the lighting device 50, respectively.

If any one of the plurality of buttons 58a to 58d is selected, the lighting device 50 may control the operation of the light source unit 56 so as to operate in the cheer mode corresponding to the selected button.

Next, an operation of the lighting device 50 in case that the lighting device 50 and the cradle 1700 are docked with each other will be described.

Figure 18A:
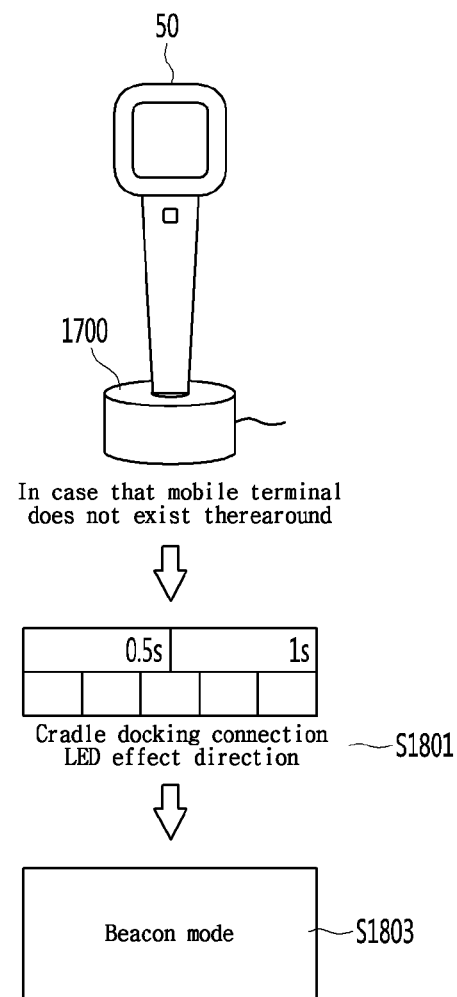
FIGS. 18A and 18B are diagrams explaining an operation process of a lighting device in case that the lighting device and a cradle are docked with each other according to an embodiment of the present disclosure.
Figure 18B:
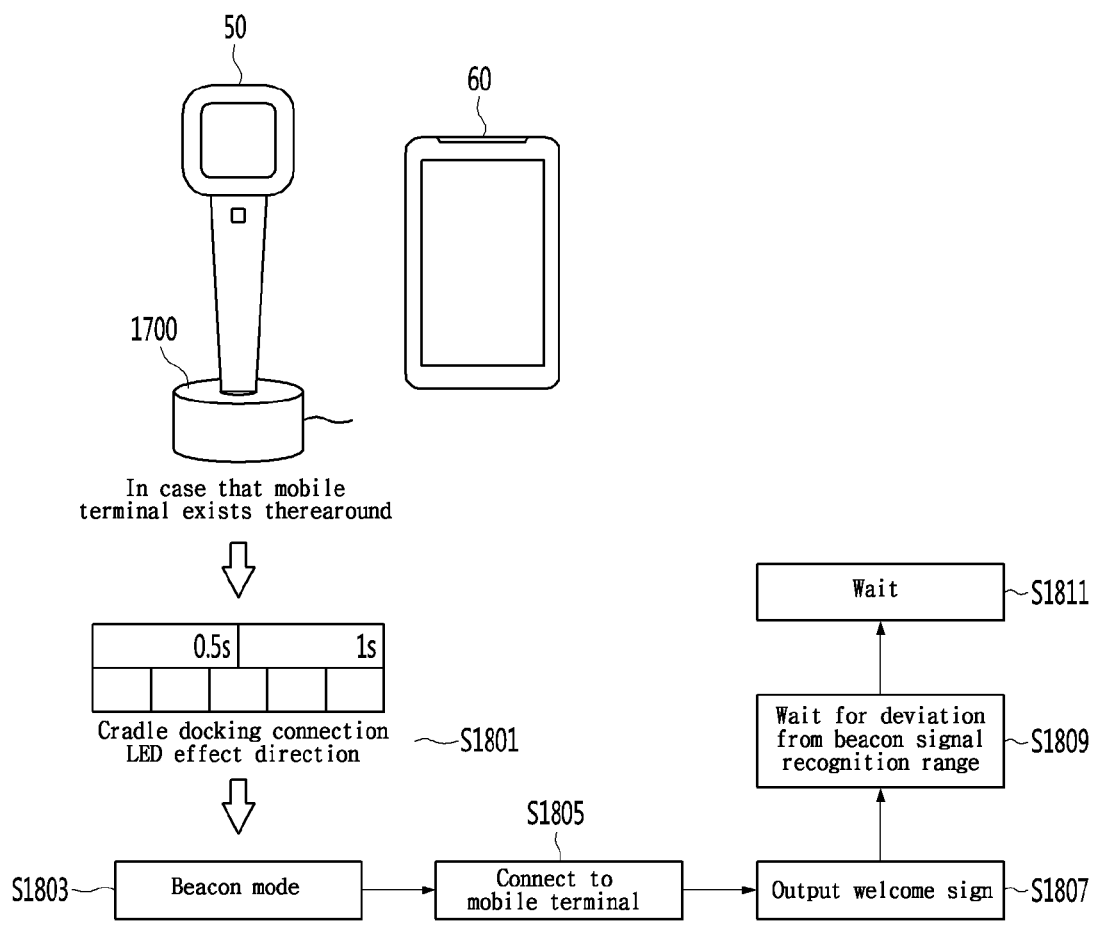

FIGS. 18A and 18B are diagrams explaining an operation process of a lighting device in case that the lighting device and a cradle are docked with each other according to an embodiment of the present disclosure.

In particular, FIG. 18A explains the operation process on the assumption that the lighting device 50 and the cradle 1700 are docked with each other and the mobile terminal 60 does not exist therearound.

In case that the lighting device 50 and the cradle 1700 are docked with each other, the lighting device 50 may output a light pattern indicating that the cradle 1700 is connected thereto (S1801).

Thereafter, the lighting device 50 may activate the BLE mode (specifically, beacon mode), and may transmit a beacon signal to outside in a broadcasting method using an AltBeacon protocol (S1803).

Referring to FIG. 18B, after performing operations S1801 and S1803, the lighting device 50 may be connected to the mobile terminal 60 in response to the beacon signal (S1805).

In case that the lighting device 50 is connected to the mobile terminal 60, the lighting device 50 may output light indicating a welcome sign (S1807).

In case that the mobile terminal 60 is connected to the lighting device 50, the mobile terminal 60 may transmit a command for outputting the light indicating the welcome sign to the lighting device 50.

Thereafter, the lighting device 50 waits for deviation from a beacon signal recognition range (S1809), that is, the lighting device 50 recognizes that the mobile terminal 60 does not exist therearound, and if the mobile terminal 60 does not exist therearound, the lighting device 50 waits for a predetermined time (S1811).

Although it has been described that all constituent elements constituting an embodiment of the present disclosure are combined into one or combined to operate, the present disclosure is not necessarily limited to such an embodiment, but one or more of all constituent elements may be selectively combined and operate within the purpose range of the present disclosure.

Further, although each of all constituent elements may be implemented as one independent hardware, parts or all of the constituent elements may be selectively combined to be implemented as a computer program having a program module performing partial or all functions of one or plural hardware combinations. Codes and code segments constituting the computer program may be easily inferred by those skilled in the art to which the present disclosure pertains. Such a computer program may be stored in a computer readable media and may be read and executed by a computer to implement an embodiment of the present disclosure. The computer program storage media include storage media including magnetic recording media, optical recording media, and semiconductor recording devices. Further, the computer program implementing an embodiment of the present disclosure includes a program module that is transmitted in real time through an external device.

Although the present disclosure has been described with reference to embodiments of the present disclosure, various modifications and changes may be applied thereto at the level of a technician with ordinary skill. Accordingly, it will be understood that such modifications and changes are included within the scope of the present disclosure unless they depart from the spirit and scope of the present disclosure.

The invention claimed is:
1. A performance system comprising:
a plurality of lighting groups including each of the lighting groups having at least one lighting device;
a control device configured to generate a control message indicating an execution command of a library;

a transmission device configured to transmit the generated control message; and a plurality of repeaters configured to transfer the control message, received from the transmission device, in a broadcasting method, wherein each of the lighting devices configured to store library data corresponding to the library and to execute the library using the stored library data in accordance with the control message received from the repeaters, wherein the library data includes information on the operating format such as turn on, turn off, and operations corresponding to various patterns of the lighting devices, and wherein each of the lighting groups operates in different patterns by one control message generated from the control device.

2. The performance system of claim 1, wherein each of the lighting devices is configured to control an operation timing of a light source unit by sequentially receiving the control message over a predetermined number of times at an initial execution of the library.

3. The performance system of claim 2, wherein each of the lighting devices is corresponding to each of a plurality of seats in a performance hall.

4. The performance system of claim 3, wherein each of the plurality of seats is corresponding to each of a plurality of pixels and each of a plurality of scenes of an image is composed of the pixels.

5. The performance system of claim 1, wherein each of the library data comprises a plurality of group identification information corresponding to the plurality of lighting groups, a plurality of library identification information for identifying the library, a plurality of start time information for operating each of the plurality of lighting groups and a plurality of pattern information output by the lighting groups.

6. The performance system of claim 5, wherein the pattern information includes information indicating a color or brightness of light output by the light source unit.

7. The performance system of claim 6, wherein each of the plurality of library identification information is configured to the plurality of group identification information.

8. The performance system of claim 7, wherein each of the plurality of group identification information is configured to one of the pattern information.

9. The performance system of claim 8, in case the control message commands a specific library identification information among of the plurality of library identification information, wherein each of the plurality of lighting groups operates differently according to the configured pattern information.

10. The performance system of claim 2, wherein each of the plurality of lighting devices is configured to control the operation timing of the light source unit included in the lighting device, in accordance with a sequence number included in each of a plurality of control messages sequentially received.

11. The performance system of claim 10, wherein each of plurality of lighting devices is configured to control the operation timing of the light source unit in accordance with a sequence number included in a subsequent control message in case that a specific control message among the plurality of control messages is not received.

12. The performance system of claim 11, wherein each of plurality of lighting devices is configured to control the light source unit to execute the library from a corresponding time point in accordance with the sequence number included in the subsequent control message.

13. The performance system of claim 1, wherein each of plurality of lighting devices is configured to receive a sync packet at predetermined intervals for checking whether to perform the library, after transmission of the plurality of control messages.

14. The performance system of claim 13, wherein the sync packet comprises information on one time point of the library and information on a pattern to be performed at the one time point.

15. The performance system of claim 14, wherein each of the lighting devices is configured to control the operation timing of the light source unit to perform the library from a time point where the sync packet is received, in case that the plurality of control messages is not received.

16. The performance system of claim 1, wherein the lighting device comprises, a light source unit;

a first communication unit configured to receive the library data from a mobile terminal;

a storage unit configured to store the library data;

a second communication unit configured to receive the control message from the control device; and a processor configured to control the light source unit to execute the library in accordance with the control message.

17. The method of operating a plurality of lighting groups, each of the lighting groups having at least one lighting device:

acquiring a control message generating from a control device;

transmitting the control message to a transmission device;

transmitting the control message received in the transmission device to a plurality of repeaters;

transmitting the control message received in the plurality of repeaters to the plurality of the lighting groups; and controlling the operations of the plurality of the lighting groups in accordance with the control message received in the lighting groups, respectively, wherein each of the lighting groups operates in different patterns by one control message generated from the control device.

18. The method of claim 17, wherein each of the lighting devices configured to store library data corresponding to the library and to execute the library using the stored library data in accordance with the control message received from the repeaters.

19. The method of claim 18, wherein the library data includes information on the operating format such as turn on, turn off, and operations corresponding to various patterns of the lighting devices.

20. The performance system of claim 19, wherein each of the lighting devices is configured to control an operation timing of a light source unit by sequentially receiving the control message over a predetermined number of times at an initial execution of the library.

* * * * *